(12) United States Patent
Kouchiyama et al.

(10) Patent No.: US 6,946,237 B2
(45) Date of Patent: Sep. 20, 2005

(54) OPTICAL DEVICE, METHOD FOR PRODUCING THE SAME AND RECORDING AND/OR REPRODUCING APPARATUS EMPLOYING THE SAME

(75) Inventors: Akira Kouchiyama, Kanagawa (JP); Koichiro Kishima, Kanagawa (JP)

(73) Assignee: Sony Corporation (JP)

( * ) Notice: Subject to any disclaimer, the term of this patent is extended or adjusted under 35 U.S.C. 154(b) by 696 days.

(21) Appl. No.: 09/943,358

(22) Filed: Aug. 31, 2001

(65) Prior Publication Data
US 2002/0030898 A1 Mar. 14, 2002

(30) Foreign Application Priority Data

Sep. 4, 2000 (JP) .................................... P2000-267810
Sep. 4, 2000 (JP) .................................... P2000-267811
Sep. 4, 2000 (JP) .................................... P2000-267812

(51) Int. Cl.$^7$ ............................ G03C 5/00; G11B 7/00
(52) U.S. Cl. ................................. 430/321; 369/112.23
(58) Field of Search ................ 369/112.01, 112.23, 369/112.24, 112.25, 112.26; 430/118, 321

(56) References Cited

U.S. PATENT DOCUMENTS 6,324,149 B1 * 11/2001 Mifune et al. ......... 369/112.01

FOREIGN PATENT DOCUMENTS

JP     10-123410     5/1998

* cited by examiner

*Primary Examiner*—Paul W. Huber
(74) *Attorney, Agent, or Firm*—Rader, Fishman & Grauer PLLC; Ronald P. Kananen

(57) ABSTRACT

An optical device used for converging a light beam on a signal recording surface of an optical disc includes an optical lens for converging the light beam on a signal recording surface of the optical disc and a light barrier portion provided on a surface of the optical lens facing the optical disc. The light barrier portion includes a light transmitting aperture through which is transmitted the light beam converged by the optical lens. The light beam illuminated on the optical disc has its diameter controlled by this light transmitting aperture. The light radiated by a light source so as to be incident to the optical device is converged by the optical lens. The light converged by the optical lens is transmitted through the light transmitting aperture and illuminated on the signal recording surface of the optical disc. The diameter of the light beam illuminated on the signal recording surface of the optical disc is controlled by the light transmitting aperture, and thus the numerical aperture NA of the optical device is determined.

4 Claims, 8 Drawing Sheets

OPTICAL DEVICE, METHOD FOR PRODUCING THE SAME AND RECORDING AND/OR REPRODUCING APPARATUS EMPLOYING THE SAME

BACKGROUND OF THE INVENTION

1. Field of the Invention

This invention relates to an optical device which is applied to a recording and/or reproducing apparatus for recording and reproducing information signals for an optical recording medium such as optical discs, a method for producing the device, and a recording and/or reproducing apparatus employing the device.

2. Description of Related Art

There has been proposed an optical disc apparatus in which an optical system is arranged on the side recording layer of an optical disc to achieve a high numerical aperture (NA) and hence the high density recording. This optical disc apparatus uses, as an objective lens used in an optical pickup, an optical device having two lenses, such as is shown in Japanese Laying-Open Patent Publication H-10-123410, as light converging means.

Of the two lenses of the optical device, shown in this Publication, the one lying towards the optical disc is a so-called hemi-spherical lens. This lens towards the optical disc and the opposite side lens are hereinafter referred to as a forward lens and a rear lens, respectively. In this optical device, the numerical aperture (NA) is determined by a diaphragm which is a light transmitting aperture provided ahead of an incidence point of a light beam radiated from a light source on the optical device. In this optical device, the light beam for signal recording, incident on the optical disc, and the light beam for reproducing the information signals recorded on the optical disc, are converged by the forward and rear lenses to fall on the optical recording layer of the optical disc.

Meanwhile, in an optical device, used in a conventional optical disc apparatus, the light beam converged by the forward and rear lenses is illuminated on the optical recording layer of the optical disc. The optical device, made up of the forward and rear lenses, is designed to suppress an eccentricity from the center axis of the light beam due to tilt of the optical axis or to assembling errors to a smallest possible value.

In an optical disc system, a high data transfer rate, a higher band for not only the focusing servo and tracking servo but also an actuator, and reduction in weight of the actuator, are being sought. For reducing the weight of the actuator, it is indispensable to reduce the size and the weight of the optical device loaded on the actuator, such that a higher assembling accuracy is required of the optical device. If the optical device, thus reduced in size and weight, is constructed so that the numerical aperture (NA) is determined by the diaphragm, the slightest deviation from the center of the optical axis of the light beam illuminated on the optical disc leads to marked variations of the diameter of the light beam illuminated on the optical recording layer.

In realizing the high density recording of the optical disc, reduction in the spot size of the light beam illuminated on the optical recording layer of the optical disc is a requirement. For reducing the spot size of the light beam, it becomes necessary to increase the numerical aperture (NA) of the objective lens used for converging the light beam.

Meanwhile, if desired to realize a large numerical aperture (NA) by a single lens, a large refracting power is required. If the refracting power is increased, the radius of curvature of the objective lens becomes smaller, with the result that the position matching tolerance of the refractive surfaces becomes narrow. Consequently, a limit on the order of 0.6 is set for the numerical aperture (NA) for a single lens.

With the lens set, made up of two lenses, that is the forward and rear lenses, as described in the aforementioned Publication, it is possible to increase the numerical aperture (NA). With this lens set, it is necessary to provide for a constant separation between first and second lenses and for accurate orientation of the second lens with respect to the first lens.

The separation between the first and second lenses and the setting of the orientation of the second lens with respect to the first lens are based on the outer profile of the respective lenses. With the first and second lenses, produced by injection molding employing metal molds, the outer profile of the lens needs to be trimmed to high precision. With the molding by the metal molds, it is only possible to mold the lens to a limited degree of precision, whereas, with the position matching based on the outer profile, it is difficult to achieve high precision position matching. If the first and second lenses, assembled together, are not positioned accurately relative to each other, the second lens may be placed at a separation different from the design separation, tilted or offset with respect to the first lens. If such variation in the separation, tilt or offset is produced, there is generated an aberration exceeding an allowable range prescribed for a single lens, for example, 0.4 rms.

Among the lenses used for an optical pickup, there are a plastic lens produced on injection molding of a synthetic resin, a glass lens produced on glass molding, and a glass lens formed on polishing. With these lenses, it is unexceptionally difficult to reduce the radius of curvature to render it difficult to produce a small diameter optical lens. In order to overcome these inconveniences, such a lens having a continuously curved surface, formed by applying the manufacturing method for a Fresnel lens, has been proposed. However, it is still difficult with this proposed method to produce a high precision lens.

OBJECT AND SUMMARY OF THE INVENTION

It is therefore an object of the present invention to provide an optical device designed to suppress eccentricity of an incident light beam from the optical axis.

It is another object of the present invention to provide a recording and/or reproducing apparatus in which it is possible to suppress variations of the spot diameter of the light beam converged and illuminated on the optical recording layer of the optical disc.

It is still another object of the present invention to provide an optical device made up of plural lenses that can be accurately position-matched and put together, and a method for producing the device.

It is yet another object of the present invention to provide a method for producing an optical device of a small size and a large radius of curvature to a high accuracy.

An optical device for converging a light beam illuminated on an optical recording medium according to the present invention includes light converging means for converging the light beam illuminated on a recording layer of the optical recording medium, and a light barrier portion formed on a surface of the light converging means facing the optical recording medium. The light barrier portion has a light transmitting aperture for permitting the light beam converged by the light converging means to pass therethrough.

The diameter of the light beam illuminated on the optical information recording medium is controlled by the light transmitting aperture.

An optical lens forming the optical device according to the present invention is formed by dry etching on one surface of a substrate formed of an optical material. A light barrier film as a light barrier portion is formed on the opposite surface of the substrate. This light barrier film is patterned by a photolithographic technique to form a light transmitting aperture for transmitting the light beam converged by the optical lens therethrough.

The optical device of the present invention includes an optical lens formed by dry etching. The position matching markers are provided around the optical lens, while the position matching markers are formed around optical lenses when forming the optical lenses by dry etching.

The optical device according to the present invention is prepared by forming an optical lens by dry etching on one surface of the substrate formed of an optical material.

In the method for the preparation of the optical device according to the present invention, a mask material corresponding to the shape of an optical lens is formed on a substrate formed of an optical material and subsequently the mask material is deformed so that its surface area is reduced by heat treatment. An optical lens having a shape conforming to the shape of the mask is transcribed by dry etching on the substrate to produce a hemispherical lens. As the etching gas, a gas mixture of at least one selected from the group of an oxygen gas, an Ar gas and a He gas and a fluorinated carbon gas is used.

The recording and/or reproducing apparatus according to the present invention uses the above-described optical device as a portion of a optical system.

Other objects, features and advantages of the present invention will become more apparent from reading the embodiments of the present invention as shown in the drawings.

DESCRIPTION OF THE PREFERRED EMBODIMENTS

Figure 1:
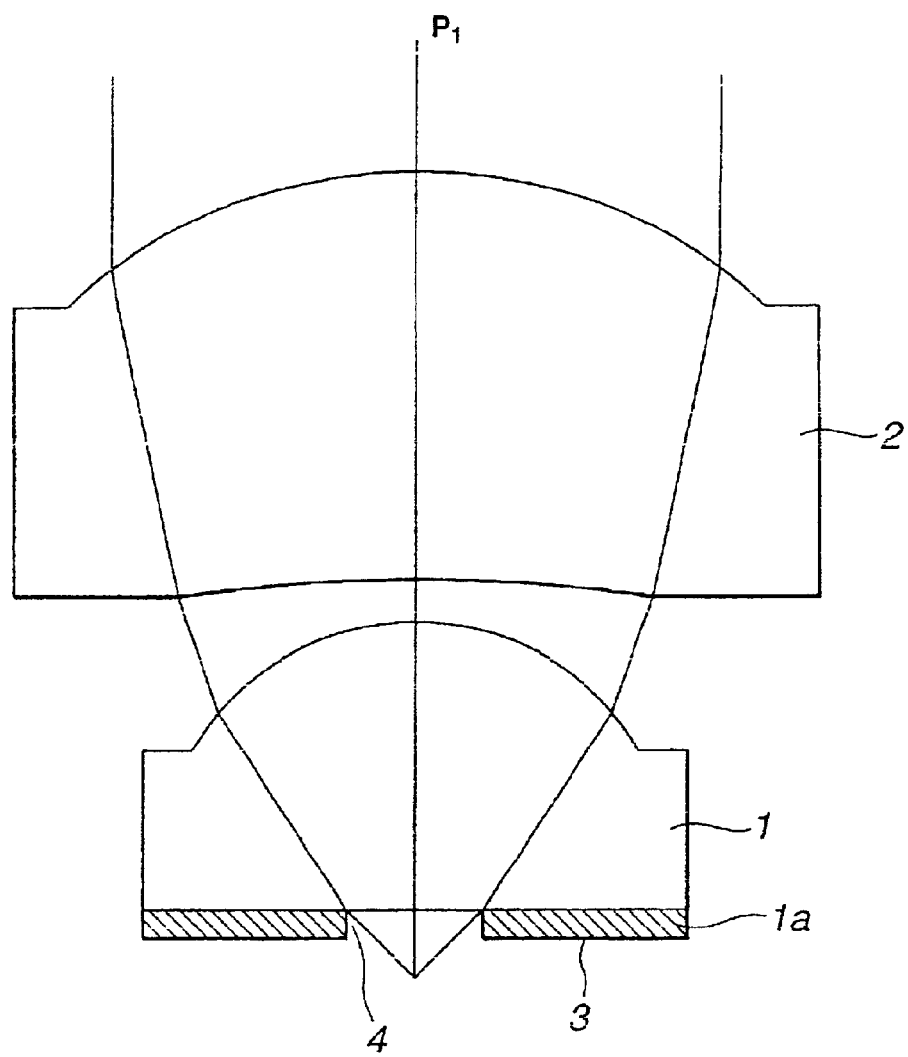
FIG. 1 is a side view showing an embodiment of an optical device according to the present invention.

Referring to the drawings, an optical device, a manufacturing method for the optical device and a recording and/or reproducing apparatus employing the optical device, according to the present invention, are hereinafter explained in detail.

The optical device according to the present invention is used for an optical pickup for a recording and/or reproducing apparatus employing an optical recording medium, such as an optical disc, and includes a plural number of optical lenses forming means for converging a light beam illuminated on the recording layer of the optical recording medium. The optical device includes a forward lens 1 and a rear lens 2 arranged so that the optical axis thereof coincide with each other, as shown in FIG. 1.

The forward lens 1 forming the optical device is a so-called hemi-spherical lens having its surface facing the optical recording medium formed as a flat surface 1a carrying a light barrier film 3 operating as light barrier; In the light harrier film 3 is bored a light transmitting aperture 4 forming a diaphragm allowing the passage of a light beam converged by the forward lens 1 therethrough, so that the center of the light transmitting aperture 4 is subsequent coincident with the optical axis $P_1$ of the forward lens 1, in such a manner that the diameter of the light beam illuminated on the light recording layer of the optical information recording will be controlled by this light transmitting aperture 4.

The light beam transmitted through the optical device of the present invention and then illuminated on the optical recording layer has its diameter controlled by the light transmitting aperture 4 provided in the light barrier film 3 to determine the numerical aperture of the optical device.

Meanwhile, with a view to preventing unneeded reflection, the light barrier film 3 is preferably provided with antireflection film(s) by, for example, AR(Anti Reflection) coating. The antireflection film(s) are preferably formed on both surfaces of the light barrier film 3.

The manufacturing method for the optical device according to the present invention, in particular the forward lens 1 having the light barrier film 3, is hereinafter explained.

The schematics of the manufacturing process for the optical device are shown in FIGS. 2 to 8.

The manufacturing process for the optical device is mainly composed of the following five steps:

(a) a step of placing a material as a mask material on a substrate, that is a step of coating the mask material to a preset thickness e.g., by a spin coating method, in case of using a photosensitive material as the mask material;

(b) a step of patterning the mask material (step of light exposure and development in case of using a photosensitive material as the mask material);

(c) a step of deforming the mask material by heat treatment, such as to reduce its surface area, for deforming the mask material to a shape having a moderately curved surface;

(d) forming a shape complying with the shape of the mask material in an optical material (forming a shape complying with the shape of the mask material in the optical material using a dry etching method in the present embodiment); and (e) forming a light barrier film and forming a light transmitting aperture therein.

Figure 2:
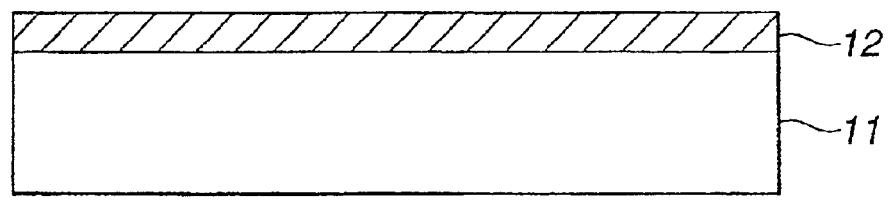
FIGS. 2 to 8 are cross-sectional views showing a manufacturing process of an optical device according to the present invention, step-by-step, FIG. 2 showing a step of forming a layer of a mask material on a substrate, FIG. 3 showing a mask forming step, FIG. 4 showing a mask deforming step by heat treatment, FIG. 5 showing a lens forming step by dry etching, FIG. 6 showing a step of forming a light barrier layer, FIG. 7 showing a resist layer forming step and FIG. 8 showing a light transmitting aperture forming step.

FIG. 2 shows the above step (a). First, a photosensitive material is coated by e.g., spin coating, on a substrate 11, formed of an optical material, to form a layer of a mask material 12.

Figure 3:
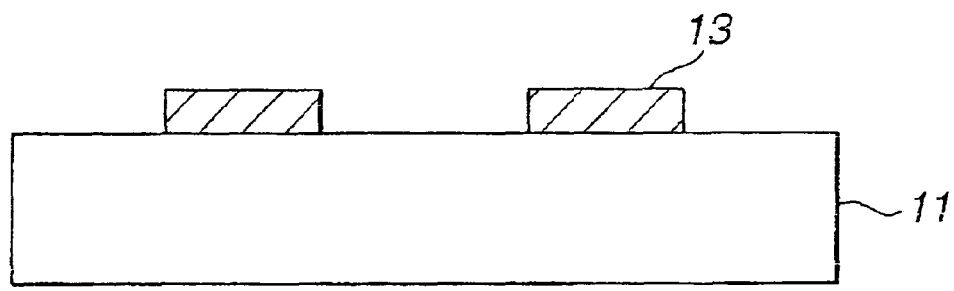

The layer of a mask material 12 then is patterned by light exposure and development, to form masks 13 in register with respective lenses, as shown in FIG. 3.

Figure 4:
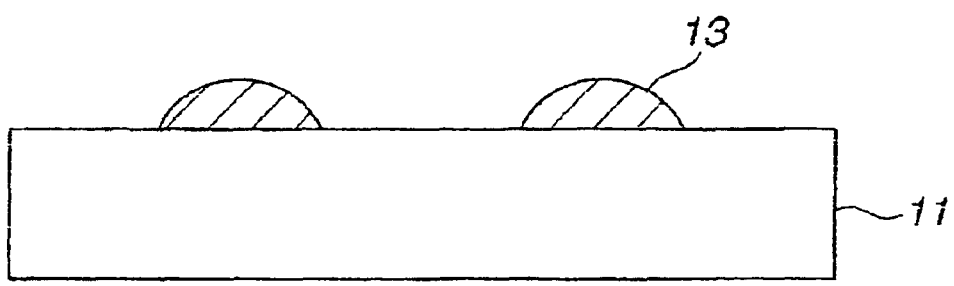

The masks 13 are then heat-treated such as to reduce the surface area of the masks 13 to deform the masks 13 to an optically smooth curved surface, as shown in FIG. 4.

It should be noted that, if an optional photosensitive material is used as a mask material, it does not necessarily occur that the mask material be deformed by heat treatment to reduce its surface area to give rise to a curved optically smooth surface.

For example, the present inventors conducted a trial operation with the heat treatment temperature ranging between 110° and 250° C., and found that, when the heating was carried out at a temperature not lower than 200° C., so-called scorching, which produced transmutation in any resist material, occurred unexceptionally. Such transmutation gives rise to a nonuniform etching rate, so that, even if it is desired to produce a shape complying with the shape of the mask material, the shape produced tends to be disturbed.

From the experimental results, in order for the mask material to become rounded on heat treatment to such a degree that an optically smooth surface will thereby be produced, the glass transition temperature Tg of the mask material needs to be lower than the heat treatment temperature. Moreover, if desired to form the mask shape to a shape of an optical lens by e.g., dry etching, it is essential that the mask material be not subjected to transmutation following heat treatment. So, the heat treatment temperature needs to be such a temperature which does not produce transmutation in the mask material.

If a plating layer is formed on the mask material and a replica is to be formed using the plating layer as a mold, the above-mentioned condition for the heat treatment temperature is not necessarily required because of lack of the etching process for the mask material. However, even though a replica is to be formed, the surface of the mask material tends to be roughed in case the mask material is transmuted on heat treatment. So, the condition of "the heat treatment temperature being such as not to cause transmutation of the mask material" is still a desirable condition even in case of forming such replica.

Moreover, if the mask is deformed in the holding state of a substrate carrying a mask, the process reproducibility is lowered, whereas, if the mask is deformed during the dry etching process, the process reproducibility is similarly lowered, so that it is necessary for the glass transition temperature Tg of the mask material to be higher than the holding temperature or the working process temperature. In the process of the present invention, the holding temperature is the room temperature, with the working process temperature being a temperature in the vicinity of the room temperature.

Since the glass transition temperature Tg generally indicates a boundary temperature for the state in which a material assumes a vitreous state, that is in which the material is fluidized without assuming a definite structure, the heat treatment temperature is desirably a temperature higher than the glass transition temperature Tg by a sufficient margin, if process stability is taken into consideration. That is, for deforming the mask material to reduce its surface area by heat treatment, the heat treatment temperature is desirably higher tens of degrees Centigrade than the glass transition temperature Tg. The deformation here enables the mask material to be fluidized by heat treatment to cause the mask material to be deformed by its surface tension.

Specifically, by setting the heat treatment temperature so as to be higher by approximately 40° C. than the glass transition temperature Tg, the mask can be deformed to a round shape in less than one hour, thus assuring high efficiency production.

From the similar perspective, as for the relation between the glass transition temperature Tg and the holding or process working temperature, the difference between the holding or process working temperature and the glass transition temperature Tg may be less than tens of degrees Centigrade.

As described above, the masks 13 are deformed to a round shape, after which the shape corresponding to the shape of the masks 13 is formed in the optical material. specifically, the shape corresponding to the shape of the masks 13 is formed in the optical material, using a dry etching method. This gives hemispherical lenses 14.

In the present embodiment, a molten quartz substrate is used as a glass material forming the substrate 11, and a photosensitive material is coated thereon to a thickness of approximately 20 $\mu$m, after which a circular pattern of approximately 120 $\mu$m is formed on light exposure and development. This circular pattern then is deformed at a heat treatment temperature of 150° C. to produce an optical lens by high density plasma etching with the aid of the magnetic neutral loop discharging (high-speed etching employing NLD plasma).

With the NLD (magnetic neutral loop discharge) plasma etching device, high efficiency discharging can be produced to generate high density plasma, by allowing the RF current to flow in a zero magnetic flux density formed to a ring shape in vacuum, thus enabling high speed etching with a damage-free process.

In the preparation of micro-sized lenses of $SiO_2$, NLD plasma etching is carried out, with the use of three different gases, $C_2F_6$, $C_3F_8$ and $O_2$ as etching gases in an atmosphere of the gas pressure in the etching chamber of 0.27 Pa, with the antenna power of 900 W and with the bias power of 300 W, to transcribe the shape of the photoresist to a quartz substrate.

The so formed optical lens has an optically smooth curved surface and, moreover, is a high NA optical lens of an extremely small diameter of the optical lens portion thereof on the order of 120 $\mu$m, with the optical lens having a crest on the order of 30 $\mu$m.

Moreover, with the so produced optical lens, the contact position between the substrate 11 and the mask 13 is not moved even after the heat treatment process, so that the mask 13 has its shape delimited by the boundary line.

It should be noted that, since the boundary line of the mask 13 is prescribed by a photomask used in exposing the photosensitive material to light, the optical lens is formed at an extremely finely defined position. On the other hand, the optical lens has its height prescribed by the boundary line.

Since the optical lens, prepared by the above-described process, is prescribed by the photomask used in exposing the photosensitive material to light, the position of the optical lens position as the sole lens and the relative positions of the two lenses of the set in case of a multi-lens unit comprised of plural optical lenses formed on the same substrate or in case of a lens array may be defined to high precision. Moreover, the produced optical lens may find a wide field of application since the optical lens produced may be of a larger NA than the conventional optical lens formed by a diffusion technique.

Figure 6:
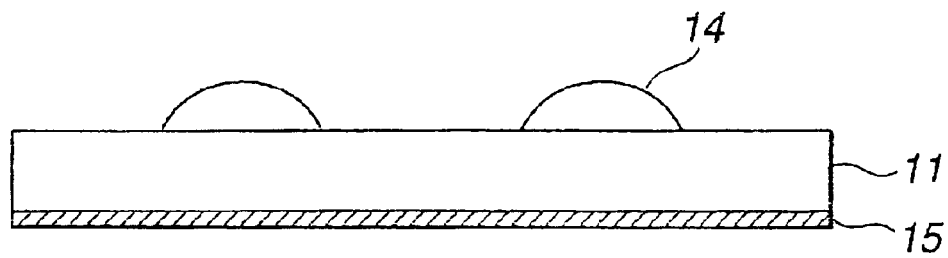

The optical lens then is adjusted to a preset thickness by a polishing step. Subsequently, a light barrier layer 15 is formed on a surface of a metal, such as Cr, on the opposite side of the surface of the substrate 11 of an optical material presenting the curved surface, as shown in FIG. 6. An AR coating is preferably applied to each surface of the light barrier layer 15 by way of eliminating stray light.

Figure 7:
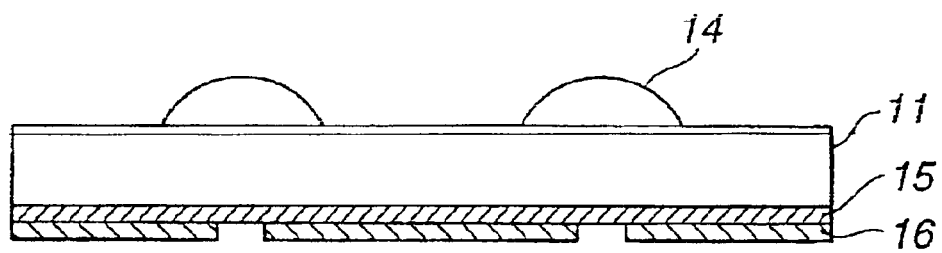
Figure 8:
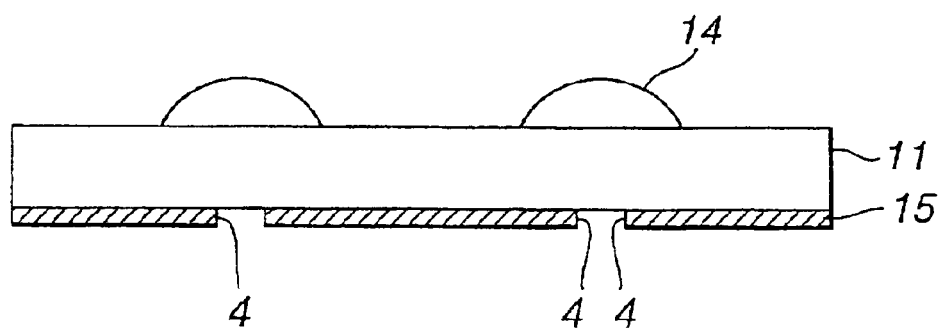

A resist layer 16 then is formed on the light barrier layer 15 and patterned in register with the light transmitting aperture, as shown in FIG. 7. The light barrier layer 15 is then etched off to form the light transmitting aperture 4, as shown in FIG. 8.

The position of forming the light transmitting aperture 4 in the optical lens as light converging means is preferably adjusted using, for example, the double-side photolithographic technique.

The optical device of the present invention, fabricated by the above process, may be used e.g., as an optical pickup of a recording and/or reproducing apparatus for recording and/or reproducing information signals on or from the optical recording medium.

Figure 9:
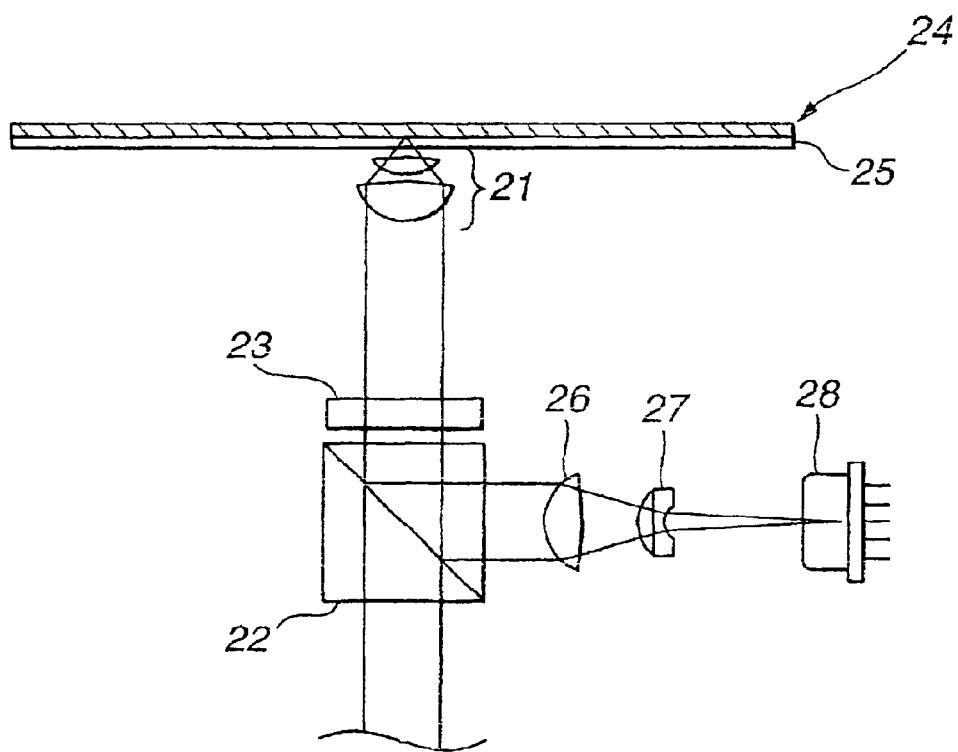
FIG. 9 is a side view showing an embodiment of an optical pickup employing the optical device according to the present invention.

FIG. 9 shows an illustrative structure of an optical pickup having a built-in optical device of the present invention.

This optical pickup uses the aforementioned optical device as an objective lens 21.

With the optical pickup according to the present invention, the linear polarized light, radiated from a semiconductor laser as a light source and formed into a parallel light beam by a collimator lens, is transmitted through a polarizing beam splitter (PBS) 22 and a λ/4 plate (quarter wave plate) 23 so as to be polarized to a circular polarized light. The light beam, polarized to circular polarized light, is converged by the objective lens 21 to fall through a disc substrate 25 on the signal recording surface of an optical disc 24.

The disc substrate 25 of the optical disc is a thin type substrate with a thickness on the order of 0.1 mm.

The objective lens 21 is combined from two lenses, as described above with reference to FIG. 1, and has a numerical aperture (NA) of 0.7 to 0.95.

The light beam incident on the optical disc and reflected by its signal recording surface, follows its former route to pass through the λ/4 plate 23 so as to be converted into a linear polarized light beam rotated through 90° in its direction of linear polarization with respect to that of the forward route. This light beam is reflected by the polarized beam splitter 22 and illuminated on a photodetector (PD) 28 through a converging lens 26 and a multiple lens 27 so as to be converted into an output electrical signal.

The multiple lens 27 of the optical pickup has a cylindrical light incident surface and a concave light radiating surface. The multiple lens 27 affords astigmatism to the incident light beam to the incident light beam for enabling detection of the focusing error signals by the so-called astigmatic method.

A photodetector 28 is, for example, a six-segment photodiode, and outputs detection signals for performing focusing adjustment and tracking adjustment by the astigmatic method and by the so-called three-beam method, respectively.

With the optical device of the present invention, in which the diameter of the light beam directed to the optical recording layer of the optical recording medium is limited by the light transmitting aperture, it is possible to diminish the variations in the light beam diameter to approximately the tolerance value even in case the optical axis of the light beam illuminated on the light recording layer of the optical recording medium is offset from the center axis of the optical device.

Moreover, since the light transmitting aperture controlling the numerical aperture (NA) of the optical device according to the present invention can be formed in a metal film formed as light barrier on the surface of the optical lens, it can be formed readily. Moreover, since no mechanical supporting structure is needed, it is possible to diminish the number of component parts.

Additionally, with the recording and/or reproducing apparatus of the present invention, in which the diameter of the light illuminated on the light recording layer of the optical recording medium is limited by the light transmitting aperture, it is possible to suppress variations in the diameter of the light beam illuminated on the optical recording layer of the optical recording medium to a value corresponding to the tolerance value even in case the center of the light beam radiated from the light source is offset from the center axis of the optical component due to tilt of the optical axis or to assembling errors.

Referring to the drawings, a modification of the optical device of the present invention is explained in detail.

The optical device includes a forward lens 1 and a rear lens 2 arranged so that the optical axis $P_1$ thereof coincide with each other, as shown in FIG. 1. In particular, the present modification is designed to provide for facilitated assembling of the position-matched forward and rear lenses 1, 2.

In the optical device of the present embodiment, position matching markers are provided around the forward lens 1 and the rear lens 2. The lenses can be assembled with the respective optical axis coincident with each other based on the position matching of these position matching markers.

Figure 10:
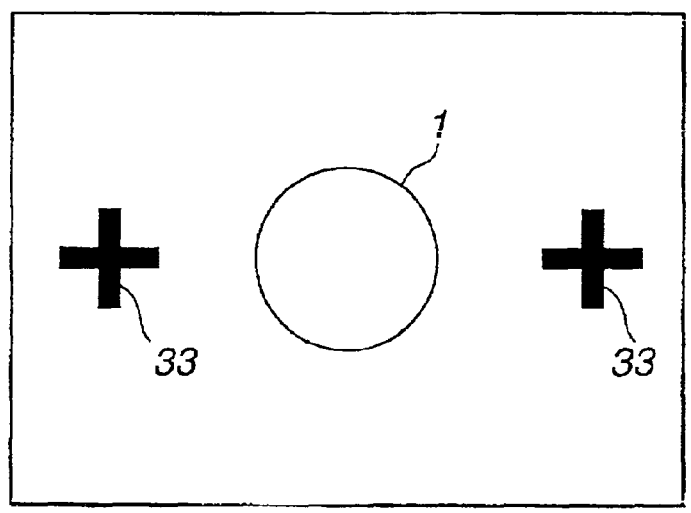
FIG. 10 is a plan view showing a forward lens provided with a position matching marker forming another embodiment of the optical device according to the present invention.
Figure 11:
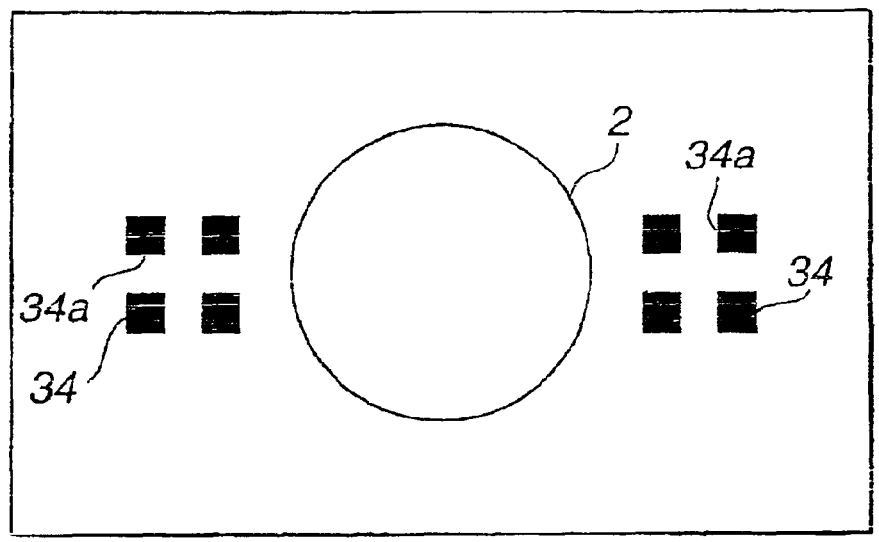
FIG. 11 is a plan view showing a rear lens provided with a position matching marker.

The forward lens 1 is provided with a cross-shaped position matching marker 33, shown in FIG. 10, whereas the rear lens 2 is provided with a recessed position matching marker 34 having slits 34a registering with the cross shape of the position matching marker 33.

Figure 12:
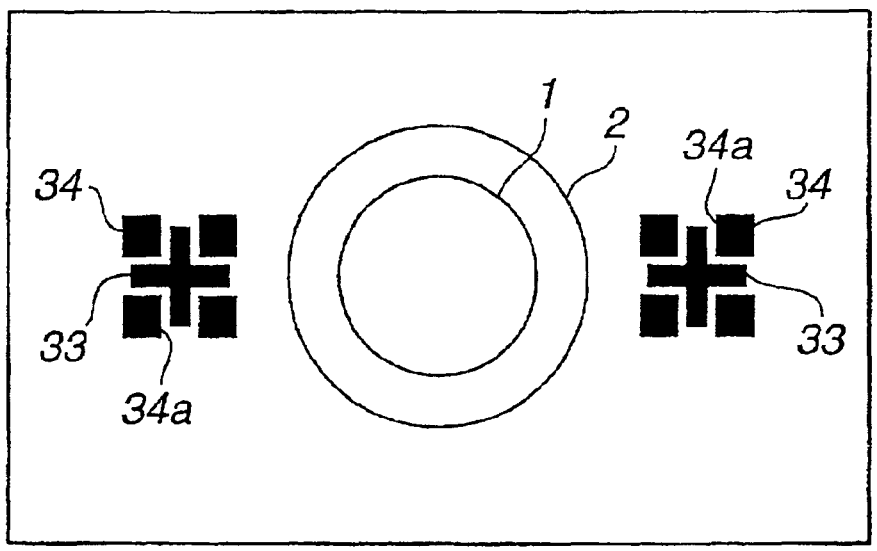
FIG. 12 is a plan view showing the state in which the forward and rear lenses have been position-matched and put together using a position matching marker.

If the forward lens 1 and the rear lens 2 are position-matched so that the markers 33, 34 register with each other, as shown in FIG. 12, using e.g., a CCD camera, the forward lens 1 and the rear lens 2 are position-matched to high accuracy as to separation, tilt or offset.

It should be noted that a small clearance is provided between the outer shape of the position matching marker 33 formed in the forward lens 1 and the slits 34a of the position matching marker 34 provided in the rear lens 2, this clearance representing the range of tolerance in position matching.

If, after initial position matching, a certain relative mismatching in position occurs between the forward lens 1 and the rear lens 2, position matching can again be achieved by exploiting the position matching markers 33, 34.

As the position matching markers 33, 34, a crest and recess pattern, produced e.g., by etching, or a pattern obtained on etching e.g., a metal film, may be used. Alternatively, in the case of a lens, produced on molding, a mark may be provided on a metal mold and transcribed to the lens for use as the position matching marker.

Figure 5:
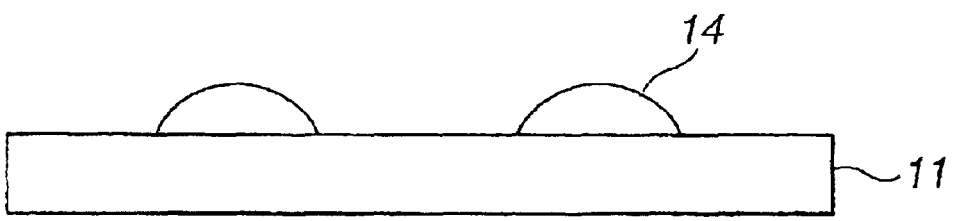
Figure 13:
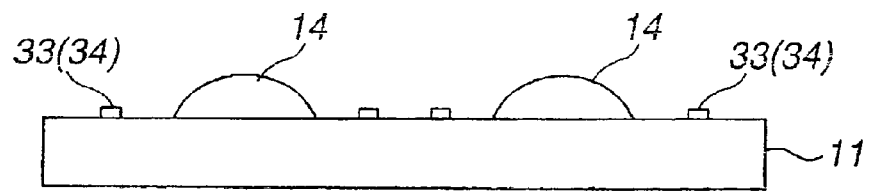
FIG. 13 is cross-sectional view showing the state of forming a position matching marker.

The position matching markers 33, 34 provided on the forward lens 1 and the rear lens 2, are formed simultaneously at the process step of forming a hemispherical lens 14 corresponding to the hemispherical mask 13 shown in FIG. 5 in the optical material in the course of the preparation of the optical device as described above. Specifically, when forming the hemispherical lens 14 corresponding to the hemispherical mask 13 by the dry etching method, the position matching markers 33, 34 are formed at the same time as the hemispherical lens 14 is formed, as shown in FIG. 13. The position matching markers 33, 34 are formed by a portion of the optical material forming the hemispherical lens 14.

In the optical device in which the forward lens 1 and the rear lens 2 are provided with the position matching markers 33, 34 used for registration, the position matching marker 33 may be used in forming the light transmitting aperture 4 in the forward lens 1 to render it possible to produce the forward lens 1 in which the optical axis of the lens is coincident with the center of the light transmitting aperture 4. This lens manufacturing method is now explained.

Figure 14:
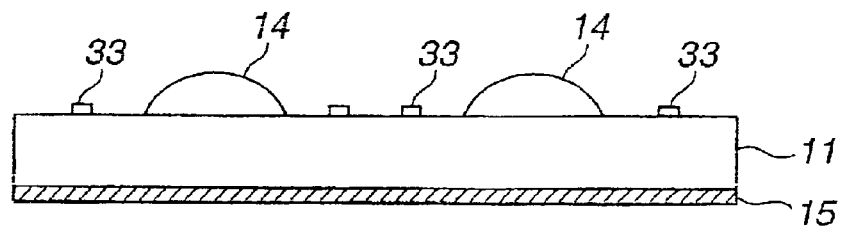
FIGS. 14 to 17 are cross-sectional views of a substrate showing the state of forming a light transmitting aperture provided in the forward lens in a substrate carrying an optical lens, with FIG. 14 showing a light barrier layer forming step, FIG. 15 showing a resist layer forming step, FIG. 16 showing a resist layer patterning step and FIG. 17 showing the state in which the layer of the mask material has been formed.
Figure 15:
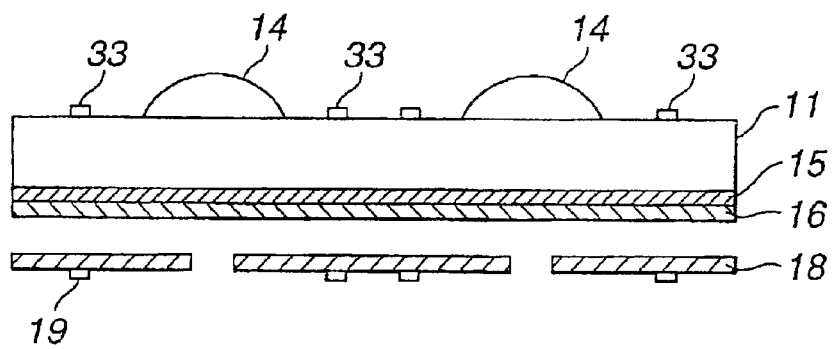
Figure 16:
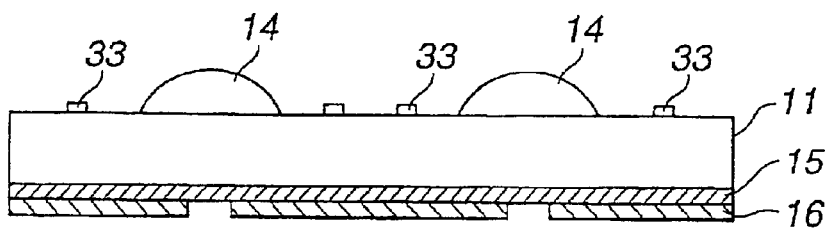
Figure 17:
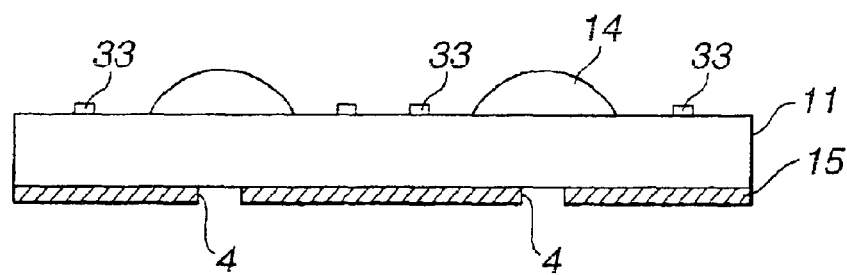

For fabricating this lens, a light barrier layer 15 is formed on the surface of the substrate 11 of the optical material opposite to its surface carrying the hemispherical lens 14 and the position matching markers 33, 34, as shown in FIG. 14. A resist layer 16 then is formed on the light barrier layer 15, as shown in FIG. 15, and the resist layer 16 is patterned in register with the light transmitting aperture, using a photomask 18, to allow the patterned resist layer 16 go be left over, as shown in FIG. 16. The light barrier layer 15 is removed by the etching process to form the light transmitting aperture 4, as shown in FIG. 17.

The position of the light transmitting aperture 4 in the optical lens 14 forming the light converging lens may be adjusted by position matching the position matching marker 33 formed around the optical lens 14 with a position matching marker 19 on the photomask 18. That is, by position matching the position matching markers 33, 19, the optical axis of the optical lens 14 forming the forward lens 1 can be brought into coincidence precisely with the center of the light transmitting aperture 4.

Similarly to the optical device, formed as described above, the optical device can be used for e.g., an optical pickup of a recording and/or reproducing apparatus recording and/or reproducing information signal on or from the optical recording medium. The optical pickup employing this optical device is constructed similarly to that shown in FIG. 9 and hence is not explained specifically.

In the above-described embodiments, the hemispherical lens, forming the optical device, is formed by the dry etching method. The method of forming the hemispherical lens on the substrate of the optical material using this dry etching method is now explained specifically.

The optical device in the present embodiment is formed by the process shown in FIGS. 18 to 21.

The manufacturing process for the optical device is mainly composed of the following five steps:

(a) a step of placing a material as a mask material on a substrate, that is a step of coating the mask material to a preset thickness e.g., by a spin coating method in case of using a photosensitive material as the mask material;

(b) a step of patterning the mask material (step of light exposure and development in case of using a photosensitive material as the mask material);

(c) a step of deforming the mask material by heat treatment, such as to reduce its surface area, for deforming the mask material to a shape having a moderately curved surface;

(d) forming a shape complying with the shape of the mask material in an optical material (forming a shape complying with the shape of the mask material in the optical material using a dry etching method in the present embodiment).

Figure 18:
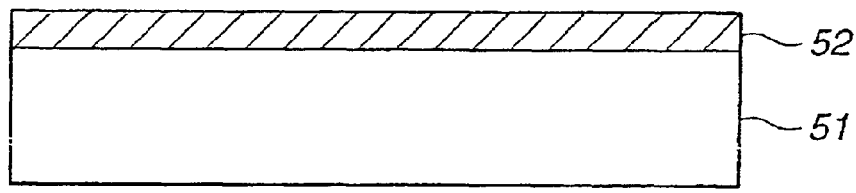
FIGS. 18 to 21 are cross-sectional views showing the manufacturing process for an optical device according to the present invention, with FIG. 18 showing a step of forming a layer of a mask material on a substrate, FIG. 19 showing a mask forming step, FIG. 20 showing a mask deforming step by heat treatment and FIG. 21 showing a lens forming step by dry etching.

The above step (a) is shown in FIG. 18. First, a photosensitive material is coated by e.g., spin coating, on a substrate 51, formed of an optical material, to form a layer of a mask material 52.

Figure 19:
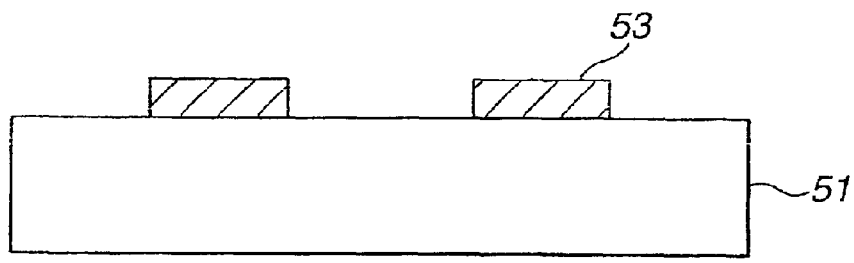

The layer of a mask material 52 then is patterned by light exposure and development, to form masks 53 in register with respective lenses, as shown in FIG. 19.

Figure 20:
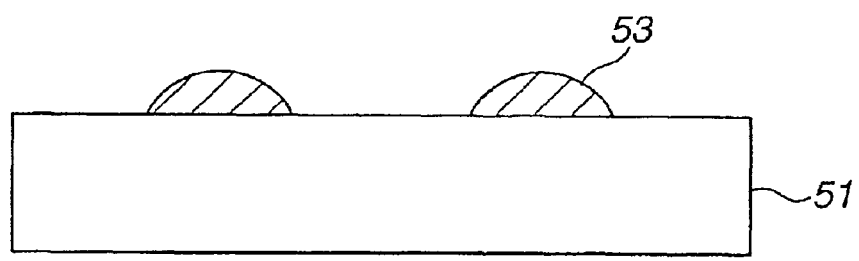
Figure 21:
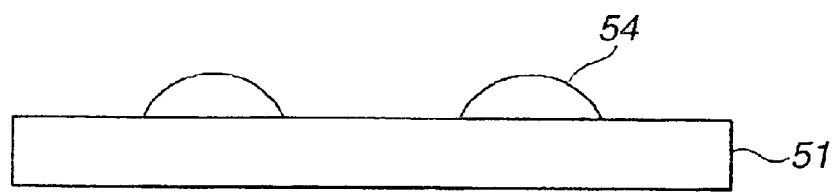

The masks 53 are then heat-treated such as to reduce the surface area of the masks 53 to deform the masks 53 to a curved optically smooth surface, as shown in FIG. 20.

The technique of deforming the mask 53 to an optically smooth surface is similar to that described in the above embodiment and is not explained specifically.

The masks 53 are deformed to a round shape, as shown in FIG. 20, after which a shape conforming to the shape of the masks 53 is formed in the optical material forming the substrate 51. Specifically, the shape corresponding to the shape of the masks 53 is formed in the optical material forming the substrate 51, using the dry etching method. This forms the hemispherical lens 54 forming the optical device of the present invention.

As the dry etching used for forming the hemispherical lens on the optical material, a high density plasma etching employing the magnetic neutral loop discharging (high-speed etching by the NLD plasma) is desirably employed.

For dry etching, selection of etching gases is crucial. Among the usable etching gases, there is a gas mixture comprised of at least one selected from an oxygen gas, an Ar gas and an He gas, and a fluorinated carbon gas.

Among the fluorinated carbon gases, there are, for example, $CHF_3$, $CH_2F_2$, $CF_4$, $C_2F_6$, $C_3F_8$, $C_4F_8$ and $C_6F_8$.

Examples of specified combinations include $C_3F_8+Ar$, $C_3F_8+O_2$, $C_3F_8+Ar+O_2$, $C_3F_8+He$, $C_3F_8+Ar+He$, $C_3F_8+He+O_2$ and $C_3F_8+Ar+He+O_2$.

In the above etching gas, Ar has the effect of improving surface properties by physical etching. The oxygen gas has the functions of removing carbonized products, and of adjusting a selection ratio. He has the functions of adjusting the gas pressure for maintaining the discharge and of performing moderate physical etching. With the use of any of the above-mentioned gas mixtures, such a lens having smooth surface properties can been formed.

Figure 22:
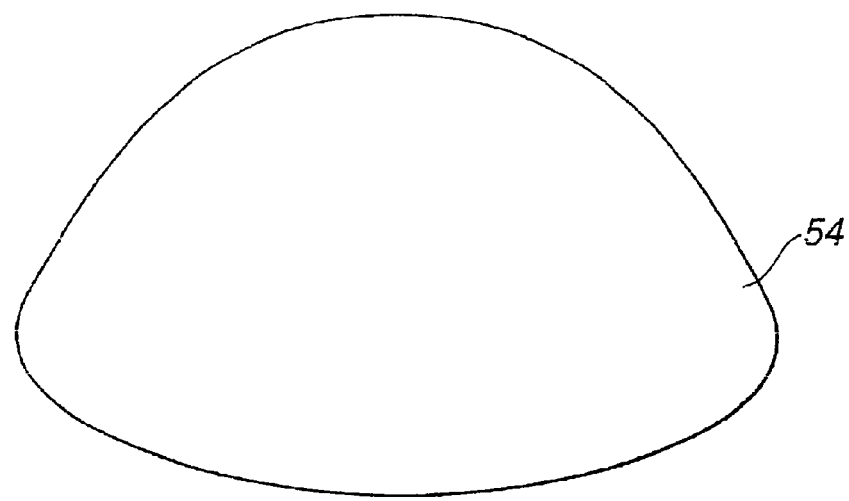
FIG. 22 is a perspective view showing surface properties of a lens formed by a dry etching method employing a mixture of an oxygen gas and a fluorinated carbon gas.
Figure 23:
FIG. 23 is a perspective view showing surface properties of a lens formed by a dry etching method employing only a fluorinated carbon gas.

FIG. 22 shows surface properties of the hemispherical lens 54, fabricated using $C_3F_8+C_2F_6+O_2$ as the etching gas, whereas FIG. 23 shows surface properties of the hemispherical lens 54, fabricated using $C_3F_8+C_2F_6$ as the etching gas.

It may be seen that use of the oxygen gas in combination leads to marked improvement in the surface properties. With the use only of the fluorinated carbon gas, fine residues are left over on the surface.

Finally, the hemispherical lens 54 is adjusted to a preset thickness by the polishing step to complete the optical lens forming the optical device according to the present invention.

In the present embodiment, as in the previous embodiment, a molten quartz substrate is used as the glass material of the substrate 51, and a photosensitive material is formed thereon to a thickness of 20 µm, after which a circular pattern of approximately 120 µm is formed by a process of light exposure and development. This pattern is deformed at a heat treatment temperature of 150° C. to produce an optical lens by high density plasma etching (high speed etching employing NLD plasma).

With the NLD (magnetic neutral loop discharge) plasma etching device, high efficiency discharging can be produced to generate high density plasma, by allowing the RF current to flow in a zero magnetic flux density formed to a ring shape in vacuum, thus enabling high speed etching with a damage-free process.

In the preparation of micro-sized lenses of $SiO_2$, NLD plasma etching is carried out, with the use of three different gases, $C_2F_6$, $C_3F_8$ and $O_2$ as etching gases in an atmosphere of the gas pressure in the etching chamber of 0.27 Pa, with the antenna power of 900 W and with the bias power of 300 W, to transcribe the shape of the photoresist to a quartz substrate.

The so formed optical lens has an optically smooth curved surface and, moreover, is a high NA optical lens of an extremely small diameter of the optical lens portion thereof on the order of 120 µm, with the optical lens having a crest with a height on the order of 30 µm.

Moreover, with the so produced optical lens, the contact position between the substrate 51 and the mask 53 is not moved even after the heat treatment process, so that the mask 53 has its shape delimited by the boundary line.

It should be noted that, since the boundary line of the mask 53 is prescribed by a photomask used in exposing the photosensitive material to light, the optical lens is formed at an extremely finely defined position. On the other hand, the optical lens has its height prescribed by the thickness of the mask 53.

Since the optical lens, prepared by the above-described process, is prescribed by the photomask used in exposing the photosensitive material to light, the position of the optical lens position as the sole lens as well as the relative positions of the two lenses of the set in case of a multi-lens unit comprised of plural optical lenses formed on the same substrate or in case of a lens array may be defined to high precision. Moreover, the produced optical lens has a wide field of application since the optical lens produced may be of a larger NA than the conventional optical lens formed by a diffusion technique.

What is claimed is:

1. A method for preparing an optical device for converging a light beam illuminated on an optical recording medium, said method comprising the steps of:

forming light converging means on one surface of a substrate consisted of an optical material by dry etching;

forming a light barrier film on an opposite side surface of said substrate; and patterning said light barrier film by a photolithographic technique to form a light transmitting aperture for transmitting the light beam converged by said light converging means therethrough.

2. The method for preparing the optical device according to claim 1 wherein a position of forming said light transmitting aperture in said light converging means is adjusted using a double-side photolithographic technique.

3. The method for preparing the optical device according to claim 1 further comprising the steps of:

forming a mask material in correspondence with a shape of an optical lens on said substrate consisted of the optical material and subsequently deforming the mask material by heat treatment so that a surface area of the substrate be reduced; and transcribing the light converging means shaped in compliance with the shape of said mask material by dry etching on said substrate.

4. The method for preparing the optical device according to claim 3 wherein a temperature of the heat treatment is higher than a glass transition temperature of the mask material and lower than a carbonizing temperature of the mask material.

* * * * *